(12) United States Patent
Au

(10) Patent No.: US 12,545,430 B2
(45) Date of Patent: Feb. 10, 2026

(54) DETERMINING AIRCRAFT STEERING ANGLE

(71) Applicant: AIRBUS OPERATIONS LIMITED, Bristol (GB)

(72) Inventor: Ting Yu Au, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 92 days.

(21) Appl. No.: 18/428,495

(22) Filed: Jan. 31, 2024

(65) Prior Publication Data

US 2024/0253818 A1 Aug. 1, 2024

(30) Foreign Application Priority Data

Jan. 31, 2023 (GB) ...................................... 2301382

(51) Int. Cl.
*B64D 45/00* (2006.01)
*G01S 7/48* (2006.01)
(Continued)

(52) U.S. Cl.
CPC ........ *B64D 45/0005* (2013.01); *G01S 7/4808* (2013.01); *G01S 17/08* (2013.01); *G01S 17/89* (2013.01); *G01S 17/933* (2013.01)

(58) Field of Classification Search
CPC ... B64D 45/0005; B64D 47/08; G01S 7/4808; G01S 17/08; G01S 17/89; G01S 17/933;
(Continued)

(56) References Cited

U.S. PATENT DOCUMENTS 5,257,756 A * 11/1993 Patzig .................... G01G 19/07
244/103 R
11,001,392 B1 * 5/2021 Kern ..................... G01G 23/002
(Continued)

FOREIGN PATENT DOCUMENTS

EP  0 980 828 A1  2/2000
EP  2 465 773 A2  6/2012
(Continued)

OTHER PUBLICATIONS

Is there a formula for calculating the pivot point of an aircraft while turning on the ground?, Jun. 10, 2016, aviation.stackexchange.com/questions/29150/is-there-a-formula-for-calculating-the-pivot-point-of-an-aircraft-while-turning, pp. 1-4.*

(Continued)

*Primary Examiner* — Andrew R Dyer
(74) *Attorney, Agent, or Firm* — Nixon & Vanderhye, PC

(57) ABSTRACT

A computer-implemented method of determining a steering angle of an aircraft landing gear is disclosed including obtaining a set of position data points, wherein the set of position data points comprises position data points of a component of the aircraft landing gear and calculating a centroid of the set of position data points. The method also includes determining an angle of an intersection between a straight line that passes through both the centroid and an axis of rotation of the aircraft landing gear and an axis that is orthogonal to a strut of the aircraft landing gear when the aircraft landing gear is at a previously known steering angle, and determining the steering angle of the aircraft landing gear based on the determined angle of intersection.

20 Claims, 5 Drawing Sheets

(51) Int. Cl.
*G01S 17/08* (2006.01)
*G01S 17/89* (2020.01)
*G01S 17/933* (2020.01)

(58) Field of Classification Search
CPC ......... B64C 25/26; B64C 25/36; B64C 25/50; G01B 21/22; G01C 1/00; G06V 20/44; G06V 20/58; G06V 20/60
USPC .............................................................. 701/3
See application file for complete search history.

(56) References Cited

U.S. PATENT DOCUMENTS

| | | | | |
|---|---|---|---|---|
| 11,702,193 | B1* | 7/2023 | Ferrier | B60T 8/1703 244/50 |
| 2005/0224642 | A1* | 10/2005 | Sullivan | B60L 7/26 244/111 |
| 2009/0069958 | A1* | 3/2009 | Regis | B64C 25/48 701/3 |
| 2012/0145823 | A1* | 6/2012 | Westerlund | G05D 1/0083 244/50 |
| 2015/0100227 | A1* | 4/2015 | Nance | B64D 45/00 701/124 |
| 2015/0293225 | A1* | 10/2015 | Riley | G01S 17/42 356/4.01 |
| 2015/0316438 | A1* | 11/2015 | Nance | B64D 45/00 701/3 |
| 2016/0195447 | A1* | 7/2016 | Nance | B64D 9/00 701/124 |
| 2017/0139045 | A1* | 5/2017 | Cherepinsky | G01S 17/88 |
| 2018/0216988 | A1* | 8/2018 | Nance | G01G 19/07 |
| 2018/0244373 | A1* | 8/2018 | Mellor | B64C 25/20 |
| 2019/0092493 | A1 | 3/2019 | Franjou et al. | |
| 2020/0354042 | A1* | 11/2020 | Schmidt | B64C 25/20 |
| 2021/0206477 | A1* | 7/2021 | Thompson | B64C 25/12 |
| 2022/0128700 | A1 | 4/2022 | Saranin et al. | |
| 2022/0292767 | A1* | 9/2022 | Cheng | G01S 17/894 |
| 2024/0046605 | A1* | 2/2024 | Capellier | G01S 17/931 |
| 2024/0119701 | A1* | 4/2024 | Nikolic | G06V 20/56 |

FOREIGN PATENT DOCUMENTS

| | | | | |
|---|---|---|---|---|
| EP | 3 421 356 | A1 | 1/2019 | |
| EP | 3583028 | B1 * | 10/2022 | ......... B64C 29/0033 |
| GB | 2612297 | A | 5/2023 | |

OTHER PUBLICATIONS

What Is Lidar & How Is It Making Self-Driving Cars Safer?, Oct. 9, 2016, www.ff.com/us/futuresight/what-is-lidar, pp. 1-12.*
Search Report for Application No. GB2301382.4, dated Jul. 18, 2023, 4 pages.
Extended European Search Report for Application No. 24154842.9, seven pages, dated Jun. 28, 2024.

* cited by examiner

DETERMINING AIRCRAFT STEERING ANGLE

CROSS RELATED APPLICATION

This application claims priority to United Kingdom Patent Application GB 2301382.4, filed Jan. 31, 2023, the entire contents of which is hereby incorporated by reference.

TECHNICAL FIELD

The present invention relates to a computer-implemented method and system of determining a steering angle of an aircraft landing gear, an aircraft controller, a non-transitory computer-readable medium and an aircraft.

BACKGROUND

During operation of an aircraft, it may be desirable for a pilot to receive feedback relating to a status of the aircraft or components thereof. This may allow the pilot to make decisions and/or take actions dependent on the status.

SUMMARY

According to a first aspect of the present invention, there is provided a computer-implemented method of determining a steering angle of an aircraft landing gear, the method comprising: obtaining a set of position data points, wherein the set of position data points comprises position data points of a component of the aircraft landing gear; calculating a centroid of the set of position data points; determining an angle of an intersection between: a straight line that passes through both the centroid and an axis of rotation of the aircraft landing gear; and a central axis that is orthogonal to a strut of the aircraft landing gear when the aircraft landing gear is at a previously known steering angle; and determining the steering angle of the aircraft landing gear based on the determined angle of intersection.

Determining the steering angle from the set of position data points may allow the steering angle to be determined in a non-intrusive manner, i.e. without physical interaction with the aircraft landing gear. The set of position data points may be obtained from a sensor which is monitoring other properties of the aircraft landing gear, which may help to reduce the total number of sensors present within a landing gear bay. The steering angle, or information related to the steering angle, may subsequently be fed back to a pilot or flight crew to assist in maneuvering an aircraft. For example, when taxiing, the pilot may be informed of the steering angle of the landing gear so as to know how the aircraft is going to move, and/or so as to know whether the landing gear is responding appropriately to a steering command. Additionally or alternatively, the steering angle or information related to the steering angle may be transmitted to a remote location, for example to allow for remote operation.

The previously known steering angle may be 0°. This may result in the determined angle of intersection being the steering angle of the aircraft landing gear. This may also reduce the amount of computation required to determine the steering angle compared to when the central axis is in another orientation, such that an offset needs to be computed, as further processing may not be required. This may minimise latency in determining the steering angle, such that an indication of the steering angle may be more quickly provided to the flight crew.

The computer-implemented method may comprise applying an offset to the determined angle of intersection to determine the steering angle of the aircraft landing gear. This may help to determine the steering angle of the aircraft landing gear when the previously known steering angle is not 0°. This may help to account for misalignments in equipment used to obtain the position data points.

Obtaining the set of position data points may comprise scanning the aircraft landing gear assembly with an imaging device to generate the set of position data points. The aircraft landing gear assembly may be scanned in real-time (e.g. during operation) to provide up to date information on the steering angle of the aircraft landing gear. This may allow a flight crew to be provided with information on the steering angle of the aircraft landing gear in real-time. The imaging device may comprise at least one of: a lidar device, a radar device, a sonar device, time-of-flight sensors or an ultrasonic rangefinder.

Obtaining the set of position data points may comprise scanning the aircraft landing gear with a lidar device to generate the set of position data points. The lidar device may quickly and accurately generate the set of position data points. The use of lidar may also allow position data points of relatively small components of the aircraft landing gear to be generated.

The computer-implemented method may comprise selecting a subset of position data points from the set of position data points, wherein calculating the centroid comprises calculating the centroid of the subset of position data points. This may allow position data points which are outliers or are otherwise not of interest to be excluded from the calculation of the centroid and therefore also from the calculation of the steering angle. This may help to improve the accuracy of the determination of the steering angle.

Selecting the subset of position data points may comprise selecting, as the subset of position data points, position data points from the set of position data points such that a standard deviation of the subset of position data points is less than a predetermined value. The subset of position data points having the standard deviation less than the predetermined value may indicate that the position data points of the subset of position data points are closely grouped. By selecting position data points such that the standard deviation is less than the predetermined value, this may help to exclude position data points which are not associated with the component of the aircraft landing gear, which may help to improve the accuracy of the calculation of the centroid point and therefore the steering angle.

Selecting the subset of position data points may comprise calculating respective distances between the axis of rotation of the aircraft landing gear and each position data point within the set of position data points, and selecting, as the subset of position data points, position data points with distances that fall within a predetermined distance range from the axis of rotation of the aircraft landing gear. The predetermined distance range may correspond to a location within which the component of the aircraft landing gear is expected to be. Any position data points which are outside of the predetermined distance range may be assumed to not correspond to the component, and may therefore be excluded from the calculation of the centroid point. This may increase the accuracy of the calculation of the centroid point and/or the steering angle.

Each position data point within the set of position data points may comprise an intensity and selecting the subset of position data points comprises determining respective intensities of the position data points within the set of position data points, and selecting, as the subset of position data points, position data points with an intensity within a predetermined range. The intensity of the position data points may help to distinguish which position data points correspond to the component. For example, position data points relating to the tyre may have a different intensity to position data points relating to the torque link due to the different materials of the tyre and the torque link. This may help to ensure that only position data points corresponding to the component of the aircraft landing gear are used to determine the centroid point, which may improve the accuracy of the calculation of the centroid point.

Selecting the subset of position data points may comprise using a clustering algorithm to determine a cluster of position data points corresponding to the component of the aircraft landing gear, and selecting the cluster of position data points as the subset of position data points. The clustering algorithm may group together the position data points corresponding to the component of the aircraft landing gear in a cluster. This cluster may then be selected as the subset of position data points from which the centroid point is determined. The clustering algorithm may group together the position data points by comparing distances between position data points. If two data points are within a predetermined distance of each other, they may be assumed to be part of the same cluster. The clustering algorithm may include centroid-based clustering (such as k-means clustering), density-based clustering or distribution-based clustering.

The set of position data points may correspond to a region within which movement of the component of the aircraft landing gear is substantially constrained. As the component of the aircraft landing gear is constrained to the region, it may be possible to assume that any position data points within that region correspond to the aircraft landing gear. This may help to reduce the computational effort required to determine the steering angle, as only the region in which the component is constrained needs to be scanned.

The component of the aircraft landing gear may comprise at least one of: a torque link and a tyre. The position of the torque link and/or the tyre may directly correspond to the steering angle of the aircraft landing gear. The torque link, and in particular the most protruding part of the torque link, may be more easily visible during operation than other components which may occluded during operation of the aircraft landing gear.

The component of the aircraft landing gear may comprise a reflector. The reflector may help to increase reflections from the component, which may make it easier to identify which position data points correspond to the component, e.g. from intensities of the position data points. The reflector may comprise a retroreflector which is configured to reflect light back along an incident path.

The aircraft landing gear may comprise a nose landing gear. Alternatively, the aircraft landing gear may comprise another landing gear which is configured to steer in use, such as a body landing gear.

According to a second aspect of the present invention, there is provided an aircraft controller configured to: obtain a set of position data points wherein the set of position data points comprises position data points of a component of the aircraft landing gear; calculate a centroid of the set of the position data points; determine an angle of an intersection between: a straight line that passes though both the centroid and an axis of rotation of the aircraft landing gear; and a central axis that it orthogonal to a strut of the aircraft landing gear when the aircraft landing gear is at a previously known steering angle; determine the steering angle of the aircraft landing gear based on the determined angle of intersection; and output an indication of the steering angle of the aircraft landing gear.

According to a third aspect of the present invention, there is provided a system for determining a steering angle of an aircraft landing gear, the system comprising: an imaging device; and an aircraft controller configured to: obtain a set of position data points using the imaging device, wherein the set of position data points comprises position data points of a component of the aircraft landing gear; calculate a centroid of the set of the position data points; determine an angle of an intersection between: a straight line that passes though both the centroid and an axis of rotation of the aircraft landing gear; and a central axis that it orthogonal to a strut of the aircraft landing gear when the aircraft landing gear is at a previously known steering angle; and determine the steering angle of the aircraft landing gear based on the determined angle of intersection.

The aircraft landing gear may comprise a nose landing gear. Alternatively, the aircraft landing gear may comprise another landing gear which is configured to steer in use, such as a body landing gear.

The imaging device may comprise a lidar system. The lidar system may quickly and accurately generate the set of position data points. The use of lidar may also allow position data points of relatively small components of the aircraft landing gear to be generated.

According to a fourth aspect of the present invention, there is provided a non-transitory computer-readable storage medium storing instructions that, when executed by an aircraft controller, cause the aircraft controller to carry out the method according to the first aspect of the present invention.

According to a fifth aspect of the present invention, there is provided an aircraft comprising the aircraft controller according to the second aspect of the present invention, the system according to third aspect of the present invention, or the non-transitory computer-readable medium according to the fourth aspect of the present invention.

BRIEF DESCRIPTION OF THE DRAWINGS

Embodiments of the invention will now be described, by way of example only, with reference to the accompanying drawings, in which.

DETAILED DESCRIPTION

Figure 1:
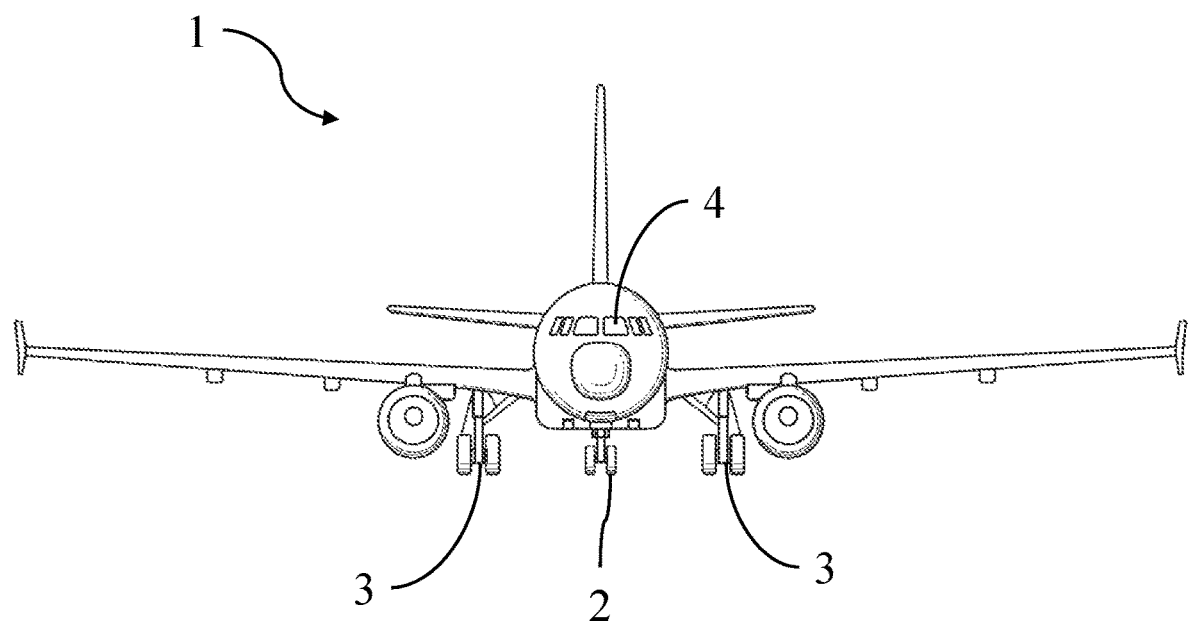
FIG. 1 shows a schematic view of view of an aircraft.

FIG. 1 shows a schematic view of an aircraft 1 according to an example. The aircraft 1 comprises a nose landing gear 2 and two sets of main landing gear 3. During movement of the aircraft 1 on the ground, the angle of the nose landing gear 2 can be adjusted to alter the trajectory of the aircraft 1 (i.e. to turn the aircraft 1). In some examples, the angle of the main landing gear 3 is also adjusted to aid movement of the aircraft 1 on the ground. The aircraft 1 comprises a cockpit 4 from which a member of the flight crew, e.g. a pilot, controls the aircraft. The cockpit comprises an interface, e.g. a joystick or dial, to control the steering angle of the nose landing gear 2.

Figure 2:
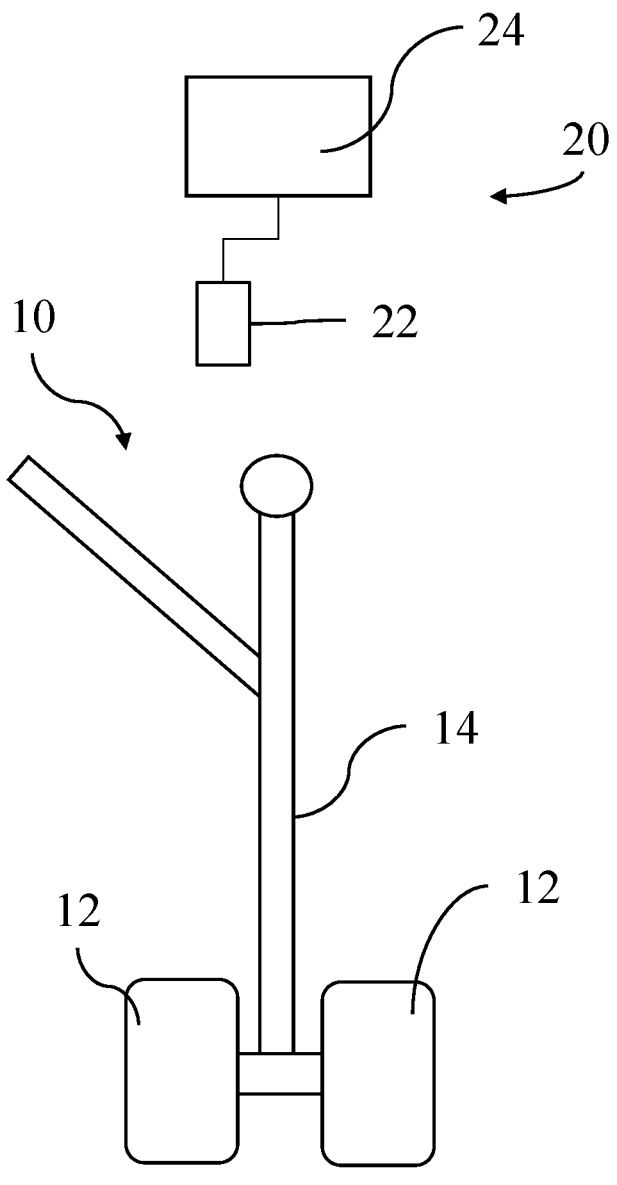
FIGS. 2 and 3 show schematic views of an aircraft landing gear of the aircraft of FIG. 1.
Figure 3:
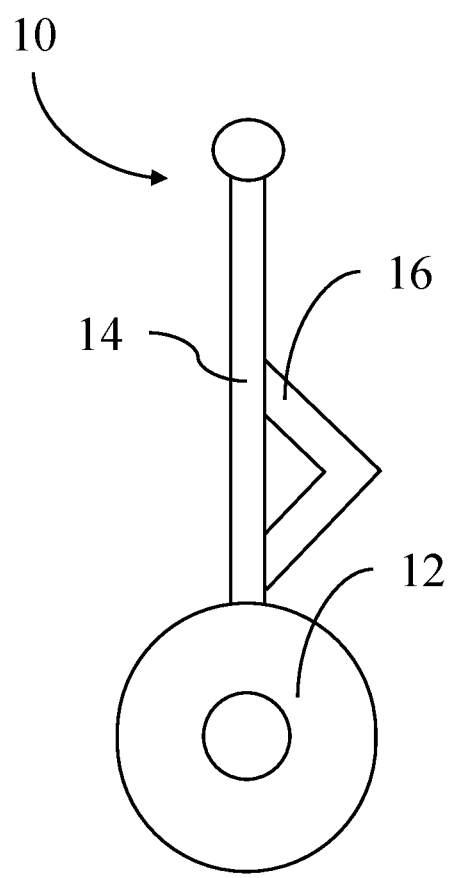

FIGS. 2 and 3 show a schematic front and side view of an aircraft landing gear 10 respectively. The aircraft landing gear 10 shown in FIGS. 2 and 3 is the nose landing gear 2 of FIG. 1. In other examples, the aircraft landing gear 10 is the main landing gear 3 of FIG. 1. The aircraft landing gear 10 comprises two tyres 12, a strut 14, and a torque link 16. The aircraft landing gear 10 is configured to be retracted and stored in a landing gear bay during flight, and to be extended for take-off and landing.

Also shown schematically in FIG. 2 is a system 20 for determining the steering angle of the aircraft landing gear 10. The system 20 comprises an imaging device 22 and an aircraft controller 24. The imaging device 22 is located within the landing gear bay and is positioned such that the aircraft landing gear 10 is in the field of view of the imaging device 22. In some examples, the imaging device 22 is located in another location, for example on a part of the aircraft landing gear 10 or on another part of the aircraft 1 which is in view of the aircraft landing gear 10. The imaging device 22 shown in FIG. 2 comprises a lidar device. In other examples, the imaging device 22 may comprise another device, such as a radar device, a sonar device, a device comprising time-of-flight sensors or an ultrasonic rangefinder. The aircraft controller 24 of the system 20 is configured to carry out any method of determining the steering angle of the aircraft landing gear 10 discussed herein.

Figure 4:
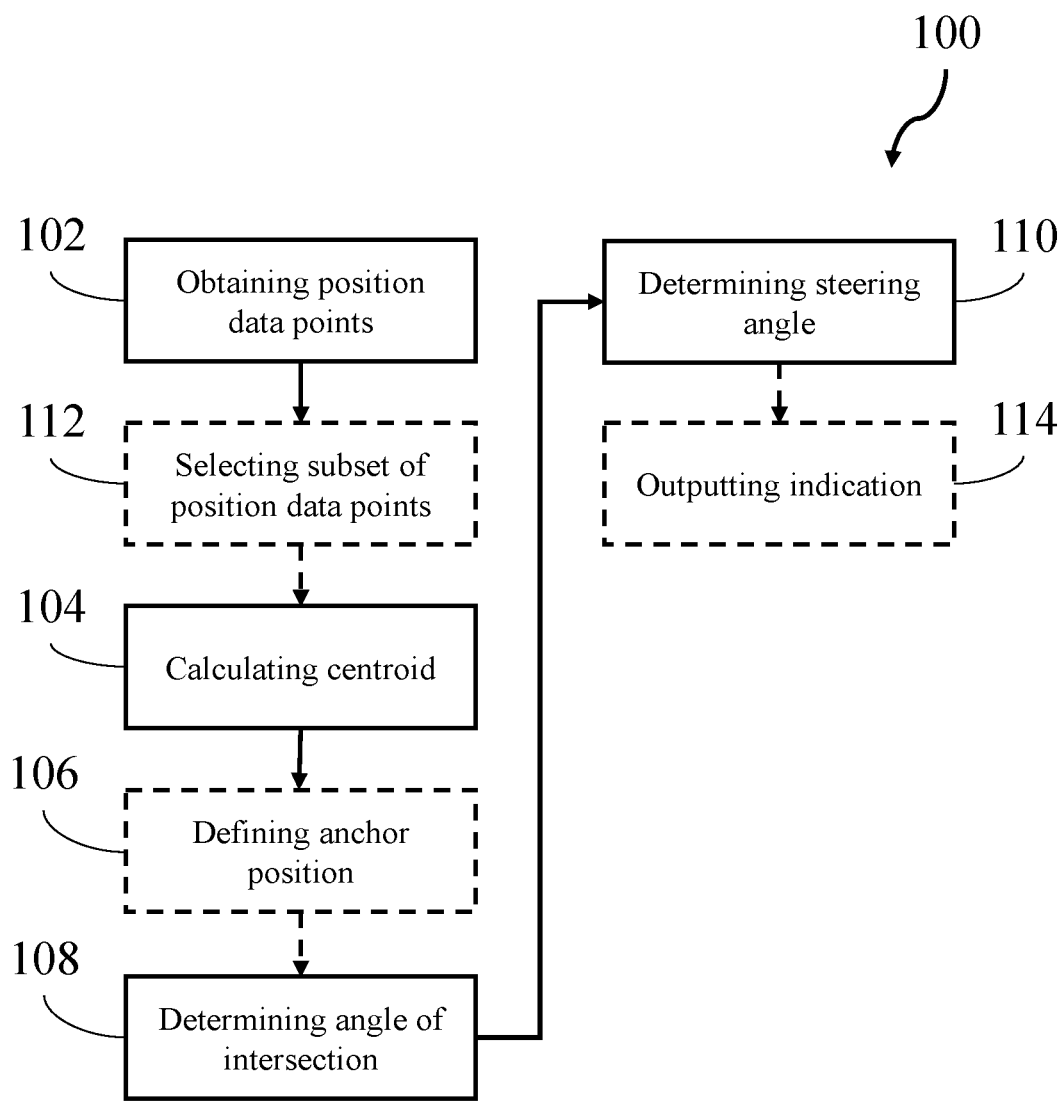
FIG. 4 shows a flow chart of a method of determining a steering angle of the aircraft landing gear.

FIG. 4 shows a flow chart of a computer-implemented method 100 of determining a steering angle of the aircraft landing gear 10. Steps of the method 100 shown in dashed boxes in FIG. 4 are optional and, in some examples, may be omitted from the method 100. The method 100 is performed by the aircraft controller 24 and comprises: obtaining 102 a set of position data points, wherein the set of position data points comprises position data points of a component of the aircraft landing gear 10; calculating 104 a centroid 42 of the set of position data points; defining 106 an anchor position 44 at a fixed location relative to the aircraft landing gear 10; determining 108 an angle of an intersection between a straight line 46 that passes through both the centroid and the anchor position, and a central axis 52 that is orthogonal to a strut 14 of the aircraft landing gear 10 when the aircraft landing gear 10 is at a previously known steering angle; and determining 110 the steering angle of the aircraft landing gear 10 based on the determined angle of intersection.

Figure 5A:
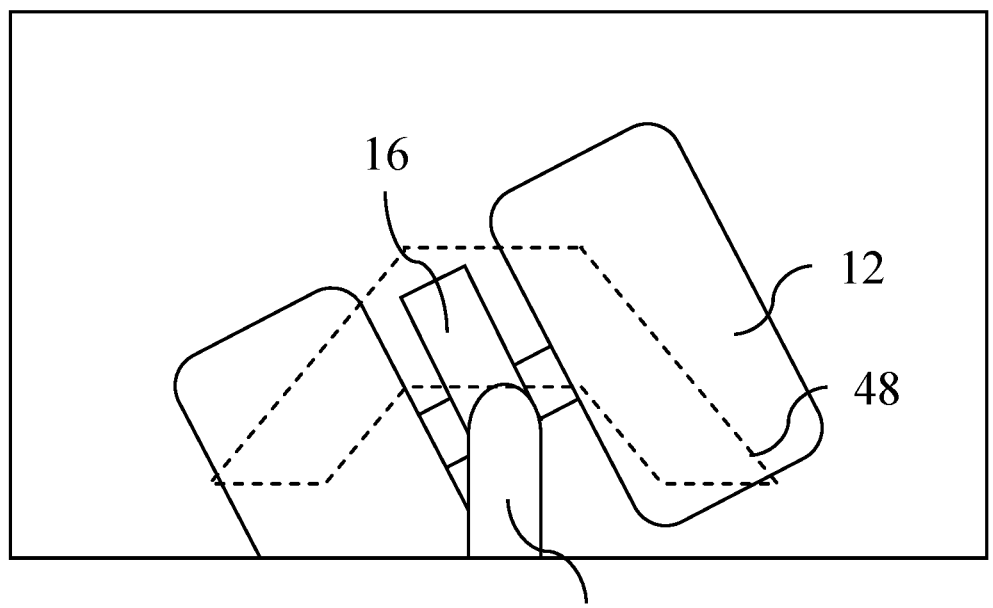
FIGS. 5a and 6a show schematic plan views of the aircraft landing gear.
Figure 5B:
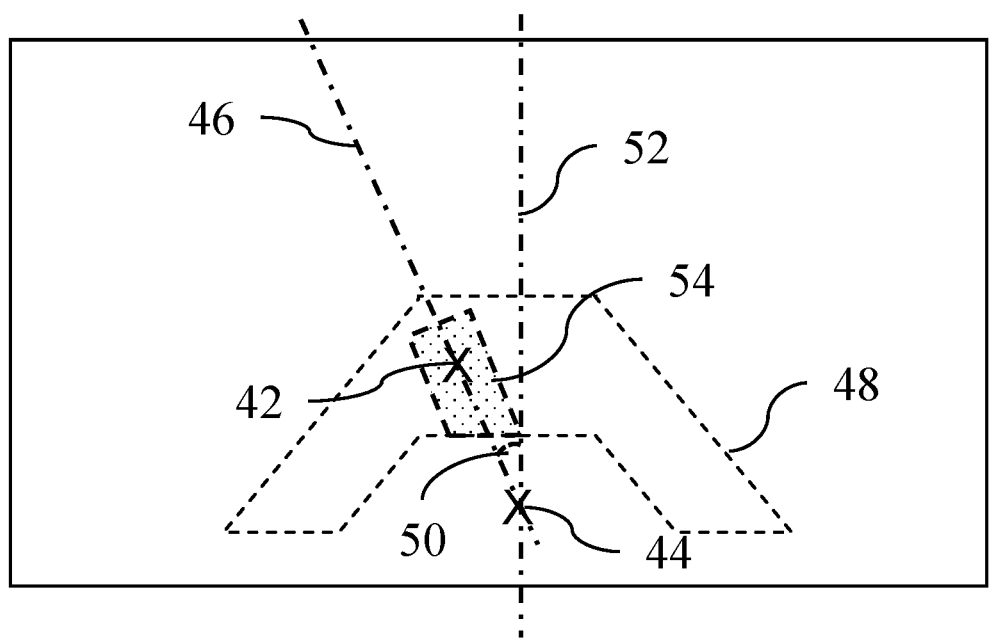
FIGS. 5b and 6b show schematic plan views of the aircraft landing gear illustrating position data points obtained by scanning the aircraft landing gear.
Figure 6A:
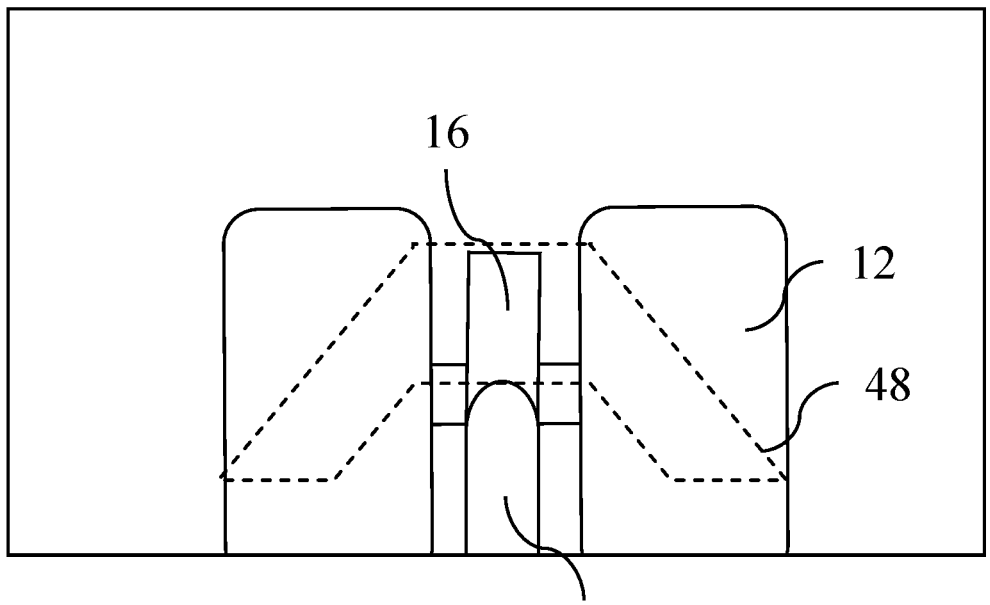
Figure 6B:
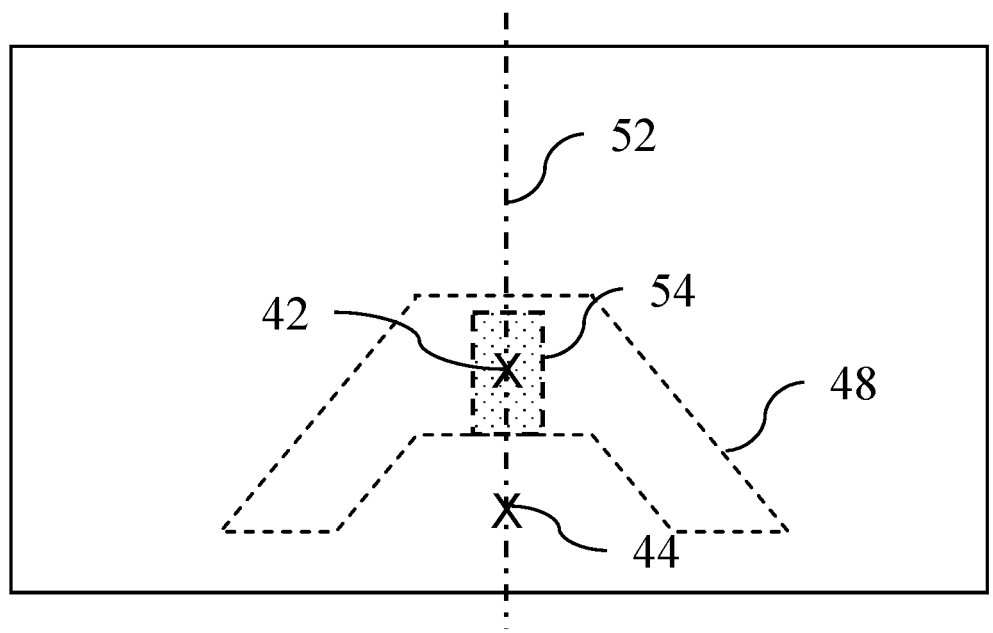

FIGS. 5a and 6a show schematic plan views of the aircraft landing gear 10 as seen from the location of the lidar device. The aircraft landing gear 10 is scanned using the lidar system to obtain the set of position data points, where each position data point is indicative of a distance of a different part of the component of the aircraft landing gear 10 from the lidar device at a single point in time. FIGS. 5b and 6b show the same views as in FIGS. 5a and 6a respectively, after the aircraft landing gear 10 has been scanned with the lidar device and the method 100 has been applied. In FIGS. 5b and 6b, the position data points comprise position data points of the torque link 16 of the aircraft landing gear. FIGS. 5a and 5b show the landing gear 10 at a first steering angle, while FIGS. 6a and 6b show the landing gear 10 at a second, different, steering angle.

After obtaining 102 the set of position data points, the method comprises selecting 112 a subset of the position data points 54. To do this, a region of interest 48 is determined.

The region of interest 48 corresponds to a region in which movement of the torque link is constrained in use (e.g. when steering the aircraft landing gear 10). The region of interest 48 is precalculated and is then applied to the position data points obtained by the method 100. The region of interest 48 provides a range of coordinate values that define the fan-shape shown in FIGS. 5a, 5b, 6a and 6b. If a position data point falls within the range of coordinate values, that position data point is determined to be within the region of interest 48. The subset of position data points 54 is then created by selecting, as the subset of position data points 54, only the position data points that are within the region of interest 48. In some examples, method 100 comprises only obtaining position data points which are within the region of interest 48. In such an example, the subset 54 includes all of the position data points from the set of position data points.

Once the subset of position data points 54 has been selected, the centroid 42 of the subset of position data points 54 is calculated. The centroid 42 indicates the centre of the subset of position data points 54 and is calculated by calculating an average position of all of the position data points within the subset of position data points 54.

The anchor position 44 is defined at a fixed location relative to the aircraft landing gear 10. The anchor position 44 is predetermined based on the aircraft landing gear 10 and the position of the imaging device 22. In FIGS. 5b and 6b, the anchor position 44 is located along an axis of rotation of the aircraft landing gear 10. The axis of rotation 44 of the aircraft landing gear 10 is the axis around which the aircraft landing gear 10 rotates to change the steering angle of the aircraft landing gear 10. In other examples, the anchor position 44 may be located in another location.

Once the centroid 42 has been calculated and the anchor position 44 has been determined, a straight line 46 is formed that passes through both the centroid 42 and the anchor position 44. From this straight line 46, the steering angle of the aircraft landing gear 10 is calculated by determining an angle of intersection 50 between the straight line 46 and the central axis 52 that is orthogonal to the strut 14 of the aircraft landing gear 10.

In the examples shown in FIGS. 5b and 6b, the central axis 52 is orthogonal to the strut 16 when the aircraft steering angle is known to be 0°. The central axis 52 is also orthogonal to an axis of rotation of the tyres 12 when the aircraft steering angle is known to be 0°. The central axis 52 therefore extends in a forward direction of the aircraft 1. As such, an angle of intersection 50 of 0° indicates that there is no steering of the aircraft landing gear 10, such that the aircraft 1 will move straight forward. A positive angle of intersection 50 indicates that the aircraft landing gear 10 is steered to the right (to turn the aircraft 1 to the right), while a negative angle of intersection 50 indicates that the aircraft landing gear 10 is steered to the left (to turn the aircraft 1 to the left). In FIG. 5b, the angle of interest 50 between the straight line 46 and the central axis 52 is negative (around) −30°, indicating that the aircraft landing gear 10 is steering to the left. In the example of FIG. 6b, the centroid 42 is on the central axis 52. As such, the steering angle of the aircraft landing gear 10 is 0°. In other words, the aircraft landing gear 10 is in a neutral position such that the aircraft 1 will move straight forward. In some examples, the central axis 52 may extend in a different direction (e.g. not in the forward direction of the aircraft 1). In such examples, an offset between the central axis 52 and the forward direction of the aircraft 1 is used to calculate the steering angle of the aircraft landing gear 10.

Once the steering angle of the aircraft landing gear 10 has been determined, the method 100 comprises outputting 114 an indication of the steering angle. The indication is displayed within the cockpit 4 of the aircraft 1, to inform the flight crew of the steering angle. In some examples, data indicative of the determined steering angle (including the determined steering angle and/or information used to determine the steering angle such as the centroid) is stored on a local memory of the aircraft 1 and/or is transmitted to a location remote from the aircraft 1 where it is stored. This data can then be analysed at a later time to, for example, verify the accuracy of the results to improve future calculations, or to determine whether the aircraft landing gear 10 operated as intended. In some examples, other systems of the aircraft 1 are operated based on the determined steering angle. For example, if the determined steering angle is sufficiently different from a desired steering angle input by the flight crew in the cockpit 4 (such that the aircraft is not steering as desired), the aircraft landing gear 2 may be operated to apply more or less steering can be applied to compensate for the difference.

Determining the steering angle of the aircraft landing gear 10 using the method described herein may allow the steering angle to be determined in a non-intrusive manner, i.e. without physical interaction with the aircraft landing gear. The set of position data points may be obtained from a sensor which is monitoring other properties of the aircraft landing gear, which may help to reduce the total number of sensors present within a landing gear bay. The steering angle, or information related to the steering angle, may subsequently be fed back to a pilot or flight crew to assist in maneuvering an aircraft. For example, when taxiing, the pilot may be informed of the steering angle of the landing gear so as to know how the aircraft is going to move, and/or so as to know whether the landing gear is responding appropriately to a steering command.

While in the example discussed above, the subset of the position data points 54 is selected based on the region of interest 48, in some examples the subset of the position data points 54 is selected in a different way. In some examples, a distance between each of the position data points and the axis of rotation of the aircraft landing gear 10 is determined and only position data points within a predetermined distance range of the axis of rotation are selected as the subset of position data points 54. The predetermined distance range is a known range of distances from the axis of rotation in which the component of the aircraft landing gear 10 is expected to be. In some other examples, the subset of the position data points 54 is selected such that a standard deviation of the subset is less than a predetermined value.

In some examples, the method comprises using a clustering algorithm. The clustering algorithm determines position data points that correspond to the component of the aircraft landing gear 10, and these position data points are selected as the subset of the position data points 54.

As the position data points are obtained by scanning the aircraft landing gear 10 with a lidar device, each position data point will also comprise an intensity (based on the intensity of the light received by the lidar device). In some examples, the position data points which have an intensity in a predetermined range are selected as the subset of the position data points 54. For example, as the torque link 16 is more optically reflective than the tyres 12, light reflected to the lidar device from the torque link 16 has a higher intensity than light reflected from the tyres 12. This allows the position data points associated with the torque link 16 (or equally the tyres 12) to be selected as the subset of position data points 54 based on the intensity of the position data points. In some examples, a reflector (such as a retroreflector) is located on the component of the aircraft landing gear 10 to increase the intensity of light reflected to the lidar device.

While in the above examples, the component of the aircraft landing gear 10 used to determine the steering angle is the torque link 16, in some examples the component is another part of the aircraft landing gear 10. In some examples, the component is a tyre 12 of the aircraft landing gear 10.

It is to be noted that the term "or" as used herein is to be interpreted to mean "and/or", unless expressly stated otherwise.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A computer-implemented method of determining a steering angle of an aircraft landing gear, the method comprising:
    obtaining a set of position data points, wherein the set of position data points comprises position data points of a component of the aircraft landing gear;
    calculating a centroid of the set of position data points that indicates the center of the subset of position data points, wherein the centroid is calculated by calculating an average position of all of the position data points within the subset of position data points;
    determining an angle of an intersection between:
        a straight line that passes through both the centroid and an axis of rotation of the aircraft landing gear; and
        a central axis that is orthogonal to a strut of the aircraft landing gear when the aircraft landing gear is at a previously known steering angle; and
    determining the steering angle of the aircraft landing gear based on the determined angle of intersection.

2. The computer-implemented method according to claim 1, wherein obtaining the set of position data points comprises scanning the aircraft landing gear assembly with an imaging device to generate the set of position data points.

3. The computer-implemented method according to claim 1, wherein obtaining the set of position data points comprises scanning the aircraft landing gear with a lidar device to generate the set of position data points.

4. The computer-implemented method according to claim 1, wherein the previously known steering angle is 0°.

5. The computer-implemented method according to claim 1, comprising selecting a subset of position data points from the set of position data points, wherein calculating the centroid comprises calculating the centroid of the subset of position data points.

6. The computer-implemented method according to claim 5, wherein selecting the subset of position data points comprises selecting, as the subset of position data points, position data points from the set of position data points.

7. The computer-implemented method according to claim 5, wherein selecting the subset of position data points comprises calculating respective distances between the axis of rotation of the aircraft landing gear and each position data point within the set of position data points, and selecting, as the subset of position data points, position data points with distances that fall within a predetermined distance range from the axis of rotation of the aircraft landing gear.

8. The computer-implemented method according to claim 5, wherein each position data point within the set of position data points comprises an intensity and selecting the subset of position data points comprises selecting, as the subset of position data points, position data points with an intensity within a predetermined range.

9. The computer-implemented method according to claim 5, wherein selecting the subset of position data points comprises using a clustering algorithm to determine a cluster of position data points corresponding to the component of the aircraft landing gear, and selecting the cluster of position data points as the subset of position data points.

10. The computer-implemented method according to claim 1, wherein the set of position data points correspond to a region within which movement of the component of the aircraft landing gear is constrained.

11. The computer-implemented method according to claim 1, wherein the component of the aircraft landing gear comprises at least one of: a torque link and a tyre.

12. The computer-implemented method according to claim 1, wherein the component of the aircraft landing gear comprises a reflector.

13. A non-transitory computer-readable storage medium storing instructions that, when executed by an aircraft controller, cause the aircraft controller to carry out the method according to claim 1.

14. An aircraft comprising the non-transitory computer-readable medium according to claim 13.

15. The computer-implemented method according to claim 1, wherein the determining the angle of the intersection is between the straight line that passes through both the centroid and an anchor position.

16. An aircraft controller configured to:
obtain a set of position data points, wherein the set of position data points comprises position data points of a component of the aircraft landing gear;
calculate a centroid of the set of position data points that indicates the center of the subset of position data points, wherein the centroid is calculated by calculating an average position of all of the position data points within the subset of position data points;
determine an angle of an intersection between:
a straight line that passes through both the centroid and an axis of rotation of the aircraft landing gear; and
a central axis that is orthogonal to a strut of the aircraft landing gear when the aircraft landing gear is at a previously known steering angle;
determine the steering angle of the aircraft landing gear based on the determined angle of intersection; and
output an indication of the steering angle of the aircraft landing gear.

17. An aircraft comprising the aircraft controller according to claim 16.

18. A system for determining a steering angle of an aircraft landing gear, the system comprising:
an imaging device; and
an aircraft controller configured to:
obtain a set of position data points using the imaging device, wherein the set of position data points comprises position data points of a component of the aircraft landing gear;
calculate a centroid of the set of position data points that indicates the center of the subset of position data points, wherein the centroid is calculated by calculating an average position of all of the position data points within the subset of position data points;
determine an angle of an intersection between:
a straight line that passes through both the centroid and an axis of rotation of the aircraft landing gear; and
a central axis that is orthogonal to a strut of the aircraft landing gear when the aircraft landing gear is at a previously known steering angle; and
determine the steering angle of the aircraft landing gear based on the determined angle of intersection.

19. The system according to claim 18, wherein the imaging device comprises a lidar system.

20. An aircraft comprising the system according to claim 18.

* * * * *